United States Patent
Johnston et al.

(10) Patent No.: US 12,426,599 B1
(45) Date of Patent: Sep. 30, 2025

(54) MULTI-ACTIVE INGREDIENT HERBICIDE COMPOSITIONS AND METHODS

(71) Applicant: Discovery Purchaser Corporation, Wilmington, DE (US)

(72) Inventors: Gregory Johnston, Raleigh, NC (US); Mathieu LeCompte, Durham, NC (US); Patrick Maxwell, Cary, NC (US); Devon Carroll, Cary, NC (US)

(73) Assignee: Discovery Purchaser Corporation, Wilmington, DE (US)

( * ) Notice: Subject to any disclaimer, the term of this patent is extended or adjusted under 35 U.S.C. 154(b) by 0 days.

(21) Appl. No.: 19/058,927

(22) Filed: Feb. 20, 2025

(51) Int. Cl.
  *A01N 43/76* (2006.01)
  *A01N 25/02* (2006.01)
  *A01N 43/40* (2006.01)
  *A01N 43/653* (2006.01)
  *A01P 13/00* (2006.01)

(52) U.S. Cl.
  CPC ............. *A01N 43/76* (2013.01); *A01N 25/02* (2013.01); *A01N 43/40* (2013.01); *A01N 43/653* (2013.01); *A01P 13/00* (2021.08)

(58) Field of Classification Search
  CPC ........ A01N 43/76; A01N 25/02; A01N 43/40; A01N 43/653; A01P 13/00
  See application file for complete search history.

(56) References Cited

U.S. PATENT DOCUMENTS

| 2010/0016158 A1 | 1/2010 | Kilian et al. | |
| 2016/0050919 A1* | 2/2016 | Byrne | A01N 37/40 |
| | | | 504/130 |
| 2018/0125073 A1* | 5/2018 | Burkhart | A01N 25/30 |

FOREIGN PATENT DOCUMENTS

| CN | 111149800 A * | 5/2020 | |
| WO | WO-2022180647 A1 * | 9/2022 | A01N 25/04 |

OTHER PUBLICATIONS

Dias, Jose Luiz C.S. et al., Relative Activity of Four Triclopyr Formulations, 2017, Weed Technology, vol. 31, pp. 928-934. (Year: 2017).*
CN111149800A, Translation, Fenoxaprop-p-ethyl damage-resistant composition for rice, 2020, Espacenet Translation. 9 pages. (Year: 2020).*
Acclaim Extra Herbicide Label. Bayer Environmental Science.

* cited by examiner

*Primary Examiner* — Ali Soroush
*Assistant Examiner* — Andriae M Holt
(74) *Attorney, Agent, or Firm* — E. Eric Mills; Nicholas P. Stadnyk; Maynard Nexsen PC

(57) ABSTRACT

In one aspect, compositions or formulations for unwanted plant control are described herein. In some embodiments, a composition described herein comprises an active ingredient component, a surfactant component, and a solvent component. In some embodiments, a composition comprises Fenoxaprop-p-ethyl, and at least one of Carfentrazone-ethyl and/or Triclopyr-butoxyethyl ester.

18 Claims, No Drawings

MULTI-ACTIVE INGREDIENT HERBICIDE COMPOSITIONS AND METHODS

FIELD

The technology described herein generally relates to compositions and methods for a multi-active ingredient herbicide, and more particularly to emulsifiable concentrate compositions comprising Fenoxaprop-p-ethyl.

BACKGROUND

Developing better herbicide formulations has become increasingly critical as agricultural challenges evolve. Current herbicides face multiple limitations, including growing weed resistance, environmental persistence concerns, and off-target effects. Many existing formulations rely heavily on a limited number of active ingredients, which has in some instances led to the emergence of resistant weed populations.

Fenoxaprop-p-ethyl is a selective post-emergence herbicide primarily used to control annual and perennial grass weeds in broadleaf crops. However, Fenoxaprop-p-ethyl exhibits notable stability concerns when formulated in solution, primarily due to its susceptibility to hydrolytic degradation, and is highly pH sensitive. Further, Fenoxaprop-p-ethyl has compatibility issues with other active ingredients, and as such, it is difficult to formulate a multiple mode of action herbicide that incorporates it.

Conventional formulations that utilize Fenoxaprop-p-ethyl concentrates and dilutions are not stable for extended periods of time and there are significant issues with its combination with other active ingredients, require a low concentration, cannot be mixed with other materials in formulation or solution.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are generally directed compositions or formulations for unwanted plant control, for example weeds. In some aspects, a composition comprises Fenoxaprop-p-ethyl and at least one other active ingredient and can be suitable for spraying or for dilution, for example with water, to form a sprayable preparation.

In some embodiments, a composition or formulation is provided comprising an active ingredient component, a surfactant component, and a solvent component. In some embodiments, a composition comprises Fenoxaprop-p-ethyl, and at least one of Carfentrazone-ethyl and/or Triclopyr-butoxyethyl ester. In some embodiments, the active ingredient component comprises Fenoxaprop-p-ethyl, Carfentrazone-ethyl, and Triclopyr-butoxyethyl ester. In some embodiments, Fenoxaprop-p-ethyl can be present in an amount of 0.1-5 wt. % based on the total weight of the composition. In some embodiments, the Carfentrazone-ethyl can be present in an amount of 0.1-5 wt. %, based on the total weight of the composition. In some embodiments, the Triclopyr-butoxyethyl ester can be present in an amount of 15-25 wt. %, based on the total weight of the composition. In some embodiments the composition is stable, for instance, the composition exhibits less than 5% degradation of the active ingredient content. In some embodiments, the composition has a low-odor.

In another aspect, methods of use, for instance a method for controlling or eradicating weeds is provided. In some instances, a method comprises providing a composition or formulation comprising an active ingredient component comprising Fenoxaprop-p-ethyl and at least one other active ingredient, a surfactant component, and a solvent component, and administering or applying the composition to an area containing weeds.

These and other embodiments are described in greater detail in the detailed description which follows.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different elements, steps, or combinations of steps and/or elements similar to the ones described in this document, in conjunction with other present or future technologies. Moreover, although the terms "step" can be used herein to connote different elements of methods employed, the terms should not be interpreted as implying any particular order among or between various steps disclosed herein unless and except when the order of individual steps is explicitly described.

Embodiments described herein can be understood more readily by reference to the following detailed description, examples, claims, and figures. Elements, systems, apparatus and methods described herein, however, are not limited to the specific embodiments presented in the detailed description, examples, claims, and figures. It should be recognized that these embodiments are merely illustrative of the principles of the present disclosure. Numerous modifications and adaptations will be readily apparent to those of skill in the art without departing from the scope of the present disclosure. Accordingly, this disclosure is not intended to embrace all such alternatives, modifications and variations that fall within the scope of the technology.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, 1 to 4, 3 to 7, 4.7 to 10.0, 3.6 to 7.9, or 5 to 8.

All ranges disclosed herein are also to be considered to include the end points of the range, unless expressly stated otherwise. For example, a range of "between 5 and 10," "from 5 to 10," or "5-10" should generally be considered to include the end points 5 and 10.

Additionally, in any disclosed embodiment, the terms "substantially," "approximately," and "about" may be substituted with "within [a percentage] of" what is specified, where the percentage includes 0.1, 1, 5, and 10 percent.

Further, when the phrase "up to" is used in connection with an amount or quantity, it is to be understood that the amount is at least a detectable amount or quantity (that is, the amount is a non-zero amount). For example, a material present in an amount "up to" a specified amount can be present from a detectable (or non-zero) amount and up to and including the specified amount. In some other aspects, for example, an amount "up to" includes a lower amount of about 0.1.

It is also to be understood that the article "a" or "an" refers to "at least one," unless the context of a particular use requires otherwise.

Fenoxaprop-p-ethyl (FPP) has historically or conventionally been a difficult molecule to stabilize in a composition or formulation, particularly in an emulsifiable concentrate (EC) formulation. As will be appreciated, many or certain herbicide active ingredients and other formulation materials (e.g. certain solvents and/or emulsifiers) are incompatible with Fenoxaprop-p-ethyl and result in compositions and formulations which are unstable, that is, for example phase separation can occur and there can be significant degradation of the active ingredient (or active ingredients), for instance in the liquid phase.

In contrast to conventional chemicals, compositions, and/or formulations, the technology described herein provides for a composition or formulation that incorporates Fenoxaprop-p-ethyl and at least one other active ingredient. Further, the technology described herein provides improved and/or reliable composition that has high stability, low odor and has effective post emergent weed control characteristics for grass and broadleaf weeds.

At a high level, aspects of the present technology generally relate to compositions and methods of use for an herbicide. In some instances, compositions or formulations described herein comprise a multi-active ingredient herbicide (e.g. two-way herbicide, three-way herbicide, etc.). In some instances, a composition or formulation described herein comprises at least two active ingredients. In some other instances, a composition or formulation described herein comprises at least three active ingredients. In some aspects, at least one of the active ingredients is Fenoxaprop-p-ethyl (FPP).

In some other aspects, a composition or formulation described herein can be formed as an emulsifiable concentrate (EC), comprising two or more (at least two), or three or more (at least three) active ingredients. In some aspects, a composition or formulation described herein is a low-odor EC composition or formulation. In some aspects, a composition or formulation described herein can maintain good stability (e.g. low degradation of active ingredients) for an extended time period after the formation of the composition or formulation as an EC. In some embodiments, a composition or formulation described herein does not exhibit any phase separation.

In some aspects, compositions or formulations, including dilutable compositions, for use as an herbicide, for example against weeds, are described herein. In some aspects, compositions and formulations described herein can be used to control common and/or difficult to control weeds, for example on turf. In some aspects as used herein, the term "turf" can be used to describe a specific type of grass or plant species growing in a monoculture used to establish a well-maintained ground cover. In some aspects, the term "turf" can refer to grass used in various settings, for example golf courses, sports fields, commercial or residential lawns, sod farms, parks, and roadsides, among other settings.

In some embodiments, a composition or formulation comprises at least two, or at least three active ingredients. In some aspects, compositions or formulations can be referred to as multi-active ingredient compositions, for instance by incorporating multiple modes of action (thereby avoiding overreliance on a single mode) In some embodiments, at least one of the active ingredients in the composition or formulation is FPP. In some embodiments, compositions or formulations described herein comprise at least one additional active ingredient. In some aspects, at least one additional active ingredient is Carfentrazone-ethyl and/or Triclopyr-butoxyethyl ester (Triclopyr-BEE).

In some aspects, a composition or formulation described herein can further comprise one or more surfactants and/or emulsifiers. In some aspects, a composition or formulation described herein can further comprise one or more solvents and/or co-solvents. In some embodiments, a composition or formulation described herein comprises two active ingredients. In some embodiments, a composition or formulation comprises three active ingredients. In some aspects, a composition or formulation described herein comprises one or more, two or more, three or more, and/or four or more surfactants and/or emulsifiers. In some embodiments, a composition or formulation comprises one or more, two or more, or three or more solvents and/or co-solvents. Other components may also be present in some embodiments of compositions described herein.

Turning now in more detail to specific components of compositions or formulations described herein, a composition or formulation described herein comprises an active ingredient component. The active ingredient component can comprise any active ingredient not inconsistent with the technical objectives of this disclosure. In some cases, the active ingredient component comprises two active ingredients. In some cases, the active ingredient component comprises three active ingredients. In some instances, at least one of the active ingredients is Fenoxaprop-p-ethyl. In some instances, at least one of the other active ingredients of the active ingredient component is one of Carfentrazone-ethyl and/or Triclopyr-butoxyethyl ester. In one example embodiment, the active ingredient component comprises Fenoxaprop-p-ethyl, Carfentrazone-ethyl, and Triclopyr-butoxyethyl ester. In another example embodiment, the active ingredient component comprises Fenoxaprop-p-ethyl and Carfentrazone-ethyl. In another example embodiment, the active ingredient component comprises Fenoxaprop-p-ethyl and Triclopyr-butoxyethyl ester.

In general, the active ingredient component of a composition or formulation described herein can be present in the composition or formulation in any amount not inconsistent with the technical objectives of the present disclosure. In some embodiments, for example, the active ingredient component is present in an amount or concentration of 1-40 wt. % or 2-30 wt. %, based on total weight of the composition. In some instances, the active ingredient component is present in an amount of 1-40 wt. %, 1-35 wt. %, 1-30 wt. %, 1-25 wt. %, 1-20 wt. %, 1-15 wt. %, 1-10 wt. %, or 1-5 wt. %, based on the total weight of the composition.

As described herein, compositions or formulations can incorporate at least two active ingredients (individual active ingredients), or in some instances can incorporate at least three active ingredients. In some aspects, compositions or formulations described herein contain two active ingredients in an active ingredient component. In some aspects, compositions or formulations described herein contain three active ingredients in an active ingredient component.

In some embodiments, an active ingredient component comprises Fenoxaprop-p-ethyl, that is, at least one active ingredient in an active ingredient component is Fenoxaprop-p-ethyl. Fenoxaprop-p-ethyl can be present in a composition or formulation described herein, for instance in the active ingredient component, in any amount not inconsistent with the technical objectives of the present disclosure. In some embodiments, for example, the Fenoxaprop-p-ethyl can be present in an amount of 0.5-10 wt. %, 1-8 wt. %, 1-5 wt. %, or 1-3 wt. %, based on the total weight of the composition. In some embodiments, for example, the Fenoxaprop-p-ethyl can be present in an amount of up 10 wt. %, up to 8 wt. %, up to 5 wt. %, or up to 3 wt. %, based on the total weight of the composition. In some embodiments, for example, the Fenoxaprop-p-ethyl can be present in an amount of less than 10 wt. %, less than 8 wt. %, less than 5 wt. %, or less than 3 wt. %, based on the total weight of the composition. In one example embodiment, the Fenoxaprop-p-ethyl is present in amount of 2-3 wt. %, based on the total weight of the composition.

In some embodiments, an active ingredient component comprises an active ingredient having a mode of action of Group 14 PPO inhibitors (i.e. inhibitors of protoporphyrinogen oxidase). In some aspects, an active ingredient component can be from the chemical family of N-Phenyl triazolinone. For example, an active ingredient component of the chemical family of N-Phenyl triazolinone which are PPO inhibitors can include carfentrazone, and in particular carfentrazone-ethyl, and/or sulfentrazone, or azafenidin.

In some embodiments, an active ingredient component comprises Carfentrazone-ethyl (CFE). In some aspects, at least one active ingredient in an active ingredient component is Carfentrazone-ethyl. Carfentrazone-ethyl can be present in a composition or formulation described herein in any amount not inconsistent with the technical objectives of the present disclosure. In some embodiments the Carfentrazone-ethyl can be present in an amount of 0.1-3 wt. %, 0.1-5 wt. %, 0.1-7 wt. %, 0.1-1 wt. %, or 0.5-1 wt. %, based on the total weight of the composition. In some embodiments, for example, the Carfentrazone-ethyl can be present in an amount of up 10 wt. %, up to 5 wt. %, up to 3 wt. %, or up to 1 wt. %, based on the total weight of the composition. In some embodiments, for example, the Carfentrazone-ethyl can be present in an amount of less than 10 wt. %, less than 5 wt. %, less than 3 wt. %, or less than 1 wt. %, based on the total weight of the composition.

In some embodiments, an active ingredient component comprises an active ingredient having a mode of action of Group 4 auxin mimics. In some aspects, an active ingredient component can be from the chemical family of pyridine carboxylate. In some instances, particular chemical families may include for example pyridyloxycarboxylates and/or 6-arylpicolinates. For example, an active ingredient component of the chemical family of pyridyloxycarboxylates, which are auxin mimics, can include triclopyr or fluroxypyr. In some instances, suitable forms of triclopyr or fluroxypyr include their ester forms. In some instances, for example, suitable forms of triclopyr can include triclopyr-butoxyethyl ester (Triclopyr-BEE) or triclopyr ethyl ester. In some instances, for example, suitable forms of fluroxypyr can include fluroxypyr methylheptyl ester. In some other aspects, example active ingredient components that are 6-arylpicolinates auxin mimics can include for example florpyrauxifen and/or halauxifen. In some other aspects, an active ingredient component can comprise a salt form of triclopyr and/or fluroxypyr.

In some embodiments, an active ingredient component comprises Triclopyr-butoxyethyl ester (Triclopyr-BEE). In some aspects, at least one active ingredient in an active ingredient component is Triclopyr-BEE. Triclopyr-BEE can be present in a composition or formulation described herein in any amount not inconsistent with the technical objectives of the present disclosure. In some embodiments the Triclopyr-BEE can be present in an amount of 1-40 wt. %, 1-30 wt. %, 10-30 wt. %, 15-35 wt. %, 15-30 wt. %, 15-25 wt. %, 20-30 wt. %, or 20-25 wt. %, based on the total weight of the composition. In some embodiments, for example, the Triclopyr-BEE can be present in an amount of up 40 wt. %, up to 30 wt. %, up to 25 wt. %, or up to 20 wt. %, based on the total weight of the composition. In some embodiments, for example, the Triclopyr-BEE can be present in an amount of less than 40 wt. %, less than 30 wt. %, less than 25 wt. %, or less than 20 wt. %, based on the total weight of the composition.

In some embodiments, a composition or formulation described herein comprises a surfactant and/or emulsifier component. Any surfactant and/or emulsifier not inconsistent with the technical objectives of the present disclosure may be used in a composition or formulation described herein. In some embodiments, for example, the surfactant and/or emulsifier component comprises a non-ionic surfactant and/or emulsifier. In some embodiments, the surfactant and/or emulsifier comprises a polymer or block copolymer. In some aspects, the surfactant and/or emulsifier comprises an ethoxylated alcohol or ethoxylated fatty alcohol. In some aspects, the surfactant and/or emulsifier comprises a polyaryl alkoxylate or alkyl ethoxylate. In some aspects, the surfactant and/or emulsifier comprises polyalkoxylated butyl ether.

In some embodiments, for example, the surfactant and/or emulsifier comprises a sorbitan ester such as sorbitan monostearate, sorbitan triesterate, or sorbitan monolaurate, a polysorbate or ethoxylated sorbitan ester. In some embodiments, the surfactant and/or emulsifier comprises polysorbate 80 (polyoxyethylene 80). Some non-limiting example of a commercially available surfactant and/or emulsifier useful in some embodiments described herein includes Ethylan® NS 500LQ, TWEEN 20, TWEEN 40, TWEEN 60, and TWEEN 80. Other commercially available surfactants and/or emulsifiers may also be used.

A surfactant and/or emulsifier (or combination of two or more surfactants and/or emulsifiers) can be present in a composition in any amount not inconsistent with the technical objectives of the present disclosure. In some embodiments, a surfactant and/or emulsifier (or combination of two or more surfactants and/or emulsifiers) is present in an amount of 1-30 wt. %, 1-25 wt. %, 1-20 wt. %, 1-15 wt. %, 1-10 wt. %, 5-15 wt. %, 1-5 wt. %, 5-10 wt. %, 3-8 wt. %, or 8-12 wt. %, based on the total weight of the composition. In some embodiments, a surfactant and/or emulsifier (or combination of two or more surfactants and/or emulsifiers) is present in an amount of about 10 wt. %, based on the total weight of the composition. In some embodiments, a surfactant and/or emulsifier (or combination of two or more surfactants and/or emulsifiers is present in an amount of up 30 wt. %, up to 20 wt. %, up to 15 wt. %, or up to 10 wt. %, based on the total weight of the composition. In some embodiments, a surfactant and/or emulsifier is present in an amount of about 5 wt. %, based on the total weight of the composition.

In some embodiments, a composition or formulation described herein comprises a solvent and/or co-solvent component. Any solvent not inconsistent with the technical objectives of the present disclosure may be used in a composition or formulation described herein. In some embodiments, for example, the solvent component comprises a non-ionic solvent. In some embodiments the solvent comprises an amide. In some instances, the solvent comprises a di-substituted amide. In some embodiments the solvent comprises N,N-dimethyloctanamide and/or N,N-dimethyldecanamide. A non-limiting example of a commercially available solvent useful in some embodiments described herein includes Hallcomid® M-8-10.

A solvent and/or co-solvent (or combination of two or more solvent and/or co-solvents) can be present in a composition in any amount not inconsistent with the technical objectives of the present disclosure. In some embodiments, a solvent and/or co-solvent (or combination of two or more solvents and/or co-solvents) is present in an amount of 40-90 wt. %, 40-80 wt. %, 50-80 wt. %, 50-70 wt. %, 80-90 wt. %, or 60-70 wt. %, based on the total weight of the composition. In some embodiments, a solvent and/or co-solvent (or combination of two or more solvents and/or co-solvents) is present in an amount of up 90 wt. %, up to 80 wt. %, up to 70 wt. %, or up to 60 wt. %, based on the total weight of the composition.

According to some embodiments, compositions or formulations described herein exhibit good stability. In one aspect, a composition exhibits a degradation in the active ingredient component (i.e. any of the one or more active ingredients included in the active ingredient component) of less than 5%, based on its weight percent in the composition, for example at ambient temperature. In some aspects, the composition exhibits degradation of less than 5%, based on its weight percent in the composition, at lower than ambient temperature. In some aspects, the composition exhibits degradation of less than 5%, based on its weight percent in the composition, at higher than ambient temperature.

The compositions or formulations described herein may be used, for example, to control, eradicate, or prevent weeds. In some aspects, compositions or formulations described herein may be used to eradicate weeds. Accordingly, aspects of the technology described herein comprise a method for controlling and/or eradicating weeds comprising administering a composition or formulation to an area susceptible to or having weeds.

In some aspects, the compositions and/or formulations described herein can have controlling, eradication, and/or prevention effects against a wide range or variety of weeds, for example various kinds of weeds on turf and/or developing on turf. In some instances, the compositions and/or formulations described herein can have herbicidal activity against a broad range of plants, for example weeds, such monocotyledonous and/or dicotyledonous plants. In some aspects, examples of weeds can include monocotyledonous weeds, such as: *Digitaria ischaemum* (Schreb.), *Digitaria sanguinalis* (L.), *Eleusine indica* (L.), *Echinochloa crusgalli* (L.), *Cenchrus incertus* (Cav.), *Microstegium viinicum* (Trin.) Camus, *Sorghum halepense* (L.) Pers., *Setaria pumila* (Poir.) Roem. & Schult., *Cynodon dactylon* (L.) Pers, etc., among others. In some aspects, examples of weeds can include dicotyledonous weeds, such as: *Glechoma hederacea* (L.), *Oxalis corniculata* (L.), *Viola sororia* (Willd.), *Cirsium arvense* (L.) Scop., *Taraxacum officinale* Weber, *Trifolium repens* (L.), *Trifolium dubium* (L.), *Veronica persica* Poir., *Veronica arvensis* (L.), *Capsella bursa-pastoris* (L.) Medik., *Laminum* spp. (L.), *Plantago lanceolata* (L.), *Trifolium repens* (L.), among others. As will be appreciated, the use of compositions and/or formulations described herein are not restricted to these examples and can be applied to and have herbicidal activity against any other weeds that are not inconsistent with the objectives of the present disclosure.

Further, as previously described herein, aspects of the present technology can be practiced with any turfgrass, their variants, and hybrids thereof, which are not inconsistent with the technical objectives of the present disclosure. In some aspects, examples of turf species may include C3 grasses (cool season grasses). In some aspects, examples of turf species can include *Lolium arundinaceum* (Schreb.) S. J. Darbyshire, *Festuca* spp., *Lolium perenne* (L.), *Poa pratensis* (L.), *Poa annua* (L.), and *Agrostis stolonifera* (L.), among others.

In some aspects, compositions, formulations, dilutions, and/or mixtures described herein can be applied or utilized pre-emergence of weeds and/or post-emergence of weeds, and accordingly in some instances compositions and/or formulations can have pre-emergence herbicidal activity, and in some other instances compositions and/or formulations can have post-emergence herbicidal activity.

In some aspects, compositions or formulations described herein can be diluted, for example with water. Compositions or formulations described herein can be diluted at any mix rate not inconsistent with the technical objectives of the present disclosure, for example up to 2 oz./gal, up to 4 oz./gal, up to 6 oz./gal, up to 8/oz./gal, or greater.

In some aspects, the compositions or formulations described herein can be formed into a spray, for example a wide-area space spray or a spot treatment spray. Compositions or formulations described herein, can in some instances, be wide-area space sprays applied via a sprayer or ULV sprayer to control weeds. In some aspects, the compositions or formulations described herein can be applied via truck, backpack blower, drone, or helicopter. Examples of wide-area spaces include, but are not limited to, urban environments, residential lawns, golf courses, farms, agricultural areas, and fields, among others.

In some aspects, compositions and formulations described herein can have an efficacy against weeds, for example in turf, of up to 70% weeds targeted, of up to 80% weeds targeted, of up to 90% weeds targeted, or up to 100% weeds targeted. In some aspects, compositions and formulations described herein can have an efficacy against weeds of greater than 70% of weeds targeted, of greater than 75% of weeds targeted, of greater than 80% of weeds targeted, of greater than 85% of weeds targeted, of greater than 90% of weeds targeted, or of greater than 95% of weeds targeted.

EXAMPLES

Some embodiments of compositions described herein are further illustrated in the following non-limiting Examples. These Examples illustrate example embodiments and should not be interpreted to encompass the entire breadth of the present disclosure.

The amounts in Tables 1 and 2 refer to the wt. % of each component of the identified composition, based on the total weight of the composition (% w/w). It is to be understood that all components of a given composition add up to 100 weight percent. Dashes (--) indicate a component is absent (zero weight percent).

TABLE 1

Example Compositions

| | | Active Ingredient Assay % | | |
|---|---|---|---|---|
| Component | Ambient % w/w | 2 wk 54° C. % w/w | 2 wk 54° C. % w/w | 2 wk 54° C. % Δ % Δ |
| Example 1 | | | | |
| Fenoxaprop-p-ethyl | 2.89 | 2.85 | 2.84 | −0.29 |
| Carfentrazone-ethyl | 0.96 | 0.94 | 0.91 | −2.95 |
| Triclopyr-BEE | 23.50 | 23.29 | 23.40 | 0.47 |

TABLE 1-continued

Example Compositions

| Component | Ambient % w/w | 2 wk 54° C. % w/w | 2 wk 54° C. % w/w | 2 wk 54° C. % Δ % Δ |
|---|---|---|---|---|
| Ethylan NS 500 LQ | 5.00 | | | |
| Tween 80 | 5.00 | | | |
| Hallcomid M-8-10 | 62.65 | | | |
| Example 2 | | | | |
| Fenoxaprop-p-ethyl | 2.89 | 2.86 | 2.88 | 0.46 |
| Carfentrazone-ethyl | 0.96 | 0.84 | 0.83 | −1.36 |
| Ethylan NS 500 LQ | 5.00 | | | |
| Tween 80 | 5.00 | | | |
| Hallcomid M-8-10 | 86.15 | | | |
| Example 3 | | | | |
| Fenoxaprop-p-ethyl | 2.89 | 2.86 | 2.90 | 1.55 |
| Triclopyr-BEE | 23.50 | 23.32 | 23.60 | 1.18 |
| Ethylan NS 500 LQ | 5.00 | | | |
| Tween 80 | 5.00 | | | |
| Hallcomid M-8-10 | 62.65 | | | |

With reference to Table 1, the stability of each composition or formulation is also shown. The compositions in accordance with aspects of the present technology show good or high stability over a period of time at ambient and elevated temperatures. As will be appreciated, stability of the compositions is shown as a function of an amount or percentage degradation of one or more of the active ingredients present in the composition. The findings of Table 1 show that in accordance with some embodiments, a percent degradation of less than 5% can be achieved.

For comparison with some embodiments described herein, Comparative Examples were prepared, using the components and amounts shown in Table 2 below. "Comp. Example" in Tables 2 refers to "Comparative Example".

TABLE 2

Comparative Compositions

| Component | Ambient %w/w | 2 wk 54° C. %w/w | 2 wk 54° C. %w/w | 2 wk 54° C. % Δ % Δ |
|---|---|---|---|---|
| Comp. Example 1 | | | | |
| Fenoxaprop-p-ethyl | 2.89 | 2.83 | 2.43 | −14.36 |
| Ethylan NS 500 LQ | 5.00 | | | |
| Tween 80 | 5.00 | | | |
| Hallcomid M-8-10 | 87.11 | | | |
| Comp. Example 2 | | | | |
| Fenoxaprop-p-ethyl | 6.59 | 6.53 | 5.85 | −10.36 |
| Ethylan NS 500 LQ | 5.00 | | | |
| Tween 80 | 5.00 | | | |
| Hallcomid M-8-10 | 83.41 | | | |
| Comp. Example 3 | | | | |
| Fenoxaprop-p-ethyl | 13.18 | 12.98 | 12.16 | −6.33 |
| Ethylan NS 500 LQ | 5.00 | | | |
| Tween 80 | 5.00 | | | |
| Hallcomid M-8-10 | 76.82 | | | |

With reference to Table 2, the stability of comparative compositions or formulations is illustrated, particularly with respect to the incorporation of Fenoxaprop-p-ethyl as a singular active ingredient without the incorporation of other active ingredients. As will be appreciated, the percentage decrease in weight percent of the active ingredient is indicated. The findings of Table 2 show that in accordance with some embodiments of the present technology, and illustrated in Table 1, a degradation of an active ingredient in the composition or formulation of less than 5% based on weight percent of the active ingredient can be achieved as compared to the Comparative Examples, which exhibit a much lower stability (or greater instability), for example a degradation of an active ingredient in the composition or formulation of greater than 5%, or greater than 10% based on weight percent of the active ingredient.

TABLE 3

Stability of Compositions

| Formulation | Storage Cond. | FPP % w/w | Δ T0 | CFE % w/w | Δ T0 | TEE % w/w | Δ T0 |
|---|---|---|---|---|---|---|---|
| Example 1 | T0 Ambient | 2.85% | | 0.94% | | 23.29% | |
| | 2 wk Ambient | 2.83% | −0.72% | 0.91% | −2.66% | 22.95% | −1.45% |
| | 2 wk 4 C. | 2.85% | 0.28% | 0.93% | −0.31% | 23.17% | −0.55% |
| | 2 wk 54 C. | 2.84% | −0.29% | 0.91% | −2.95% | 23.40% | 0.47% |
| | 2 wk −18/+40 C. | 2.87% | 0.74% | 0.92% | −1.33% | 23.44% | 0.61% |
| Comp. Example 1 | T0 Ambient | 2.83% | | | | | |
| | 2 wk Ambient | 2.81% | −0.99% | | | | |
| | 2 wk 4 C. | 2.84% | 0.36% | | | | |
| | 2 wk 54 C. | 2.43% | −14.36% | | | | |
| | 2 wk −18/+40 C. | 2.83% | −0.27% | | | | |
| Comp. Example 2 | T0 Ambient | 6.53% | | | | | |
| | 2 wk Ambient | 6.44% | −1.32% | | | | |
| | 2 wk 4 C. | 6.51% | −0.32% | | | | |
| | 2 wk 54 C. | 5.85% | −10.36% | | | | |
| | 2 wk −18/+40 C. | 6.43% | −1.47% | | | | |
| Comp. Example 3 | T0 Ambient | 12.98% | | | | | |
| | 2 wk Ambient | 12.99% | 0.11% | | | | |
| | 2 wk 4 C. | 13.03% | 0.42% | | | | |
| | 2 wk 54 C. | 12.16% | −6.33% | | | | |
| | 2 wk −18/+40 C. | 12.88% | −0.75% | | | | |
| Example 2 | T0 Ambient | 2.86% | | 0.84% | | | |
| | 2 wk Ambient | 2.93% | 2.33% | 0.84% | −0.31% | | |
| | 2 wk 54 C. | 2.88% | 0.46% | 0.83% | −1.36% | | |
| Example 3 | T0 Ambient | 2.86% | | | | 23.32% | |
| | 2 wk Ambient | 2.92% | 2.32% | | | 23.45% | 0.56% |
| | 2 wk 54 C. | 2.90% | 1.55% | | | 23.60% | 1.18% |

With Reference to Table 3, a detailed summary of the stability and/or degradation characteristics of the compositions or formulation of Examples 1, 2, and 3, as well as Comparative Examples 1, 2, and 3 are illustrated with respect to various storage conditions over time. Table 3 shows that the compositions or formulations show good stability and little degradation for various storage conditions over time, while the formulations of the comparative examples show instability and high degradation of the active ingredient. As can be seen, compositions or formulations according to aspects of the technology described herein exhibit a degradation of any one of the active ingredients of less than 5%. In some cases, as shown, compositions or formulations according to aspects of the technology described herein exhibit a degradation of any one of the active ingredients of less than 3%.

TABLE 4

Composition Physical Properties

| Example 1 | 0 day | 2 week Amb. | 2 week 4 C. | 2 weeks 54 C. | 2 weeks −18 C./+40 C. cycle |
|---|---|---|---|---|---|
| Appearance | clear light yellow | clear light yellow | clear light yellow | clear light yellow | clear light yellow |
| pH (1%) | 5.00 | 4.98 | 5.15 | 4.68 | 4.92 |
| Emulsion Stability (CIPAC MT 36.3) TAP 2% v/v, 2 hr, no separation, 1WHO | pass | pass | pass | pass | pass |
| Persistent Foaming (MT 47.3) 1WHO, mL at 1/3/12 mins | T0 = 60 48, 24, 10 | 49/18/12 | T0 = 60 50/32/22 | T0 = 60 55/26/10 | T0 = 60 48/12/8 |
| Density g/mL | 0.989 | 0.989 | 0.990 | 0.990 | 0.989 |
| Water Content by KF Assay % w/w | 0.22% | 0.24% | 0.23% | 0.22% | 0.22% |
| Fenoxaprop-p-ethyl (% w/w) | 2.85% | 2.83% | 2.85% | 2.84% | 2.87% |
| Fenoxaprop-p-ethyl (g/L) | 28.15 | 27.9 | 28.3 | 28.1 | 28.4 |
| Carfentrazone-ethyl (% w/w) | 0.94% | 0.91% | 0.93% | 0.91% | 0.92% |

TABLE 4-continued

Composition Physical Properties

| Example 1 | 0 day | 2 week Amb. | 2 week 4 C. | 2 weeks 54 C. | 2 weeks −18 C./ +40 C. cycle |
|---|---|---|---|---|---|
| Carfentrazone-ethyl (g/L) | 9.26 | 9.0 | 9.2 | 9.0 | 9.1 |
| Triclopyr-BEE (% w/w) | 23.29% | 22.95% | 23.17% | 23.40% | 23.44% |
| Triclopyr-BEE (g/L) | 230.37 | 227.02 | 229.34 | 231.69 | 231.77 |

With reference to Table 4, various physical properties of the composition of Example 1 are experimentally illustrated in greater detail.

Tables 5 and 6 show a summary of stability of the composition of Example 1, as well as degradation with respect to the active ingredients, respectively.

TABLE 5

Active Ingredient Stability

| Example 1 | Initial | 2 week Amb. | 2 week 4 C. | 2 weeks 54 C. | 2 weeks −18 C./ +40 C. cycle |
|---|---|---|---|---|---|
| Fenoxaprop-p-ethyl | 2.85% | 2.83% | 2.85% | 2.84% | 2.87% |
| Carfentrazone-ethyl | 0.94% | 0.91% | 0.93% | 0.91% | 0.92% |
| Triclopyr-BEE | 23.29% | 22.95% | 23.17% | 23.40% | 23.44% |

With reference to Table 5, the composition exhibits good stability over time at the indicated storage conditions.

TABLE 6

Active Ingredient Degradation

| Example 1 | Initial | 2 week Amb. | 2 week 4 C. | 2 weeks 54 C. | 2 weeks −18 C./ +40 C. cycle |
|---|---|---|---|---|---|
| Fenoxaprop-p-ethyl | 100.00% | 99.28% | 100.28% | 99.71% | 100.74% |
| Carfentrazone-ethyl | 100.00% | 97.34% | 99.69% | 97.05% | 98.67% |
| Triclopyr-BEE | 100.00% | 98.55% | 99.45% | 100.47% | 100.61% |

With reference to Table 6, the composition exhibits a low percentage degradation of active ingredients over time at the indicated storage conditions. As illustrated, the active ingredient degradation for any of the active ingredients indicated is less than 5%.

The below non-limiting examples illustrate specific efficacy testing comparative to some other herbicidal agents.

Post-Emergence Efficacy Testing Example 1—Dicot Weed Control.

A formulation (emulsifiable concentrate) containing a mixture of Fenoxaprop-p-ethyl, Carfentrazone-ethyl, and Triclopyr-butoxyethyl ester was applied to an area of turf and weeds with a water volume of approximately 374 liter/ha with a spraying device ($CO_2$ propelled backpack sprayer) on the turf grass species and the weed species indicated below at the application rate indicated in Table 7. Turf maintenance was performed according to local practice in respect to mowing intervals, irrigation, and fertilization.

Turf grass species: *Stenotaphrum secundatum*, variety 'Raleigh'; Weed species: *Trifolium repens*, Location: Lawn turf, North Carolina, USA; Plot size: 2 m² and 4 replicates per treatment; Application timing: May 2024.

The efficacy evaluation was performed over a period of 56 days after the application or treatment (DAT). Efficacy or effectiveness was assessed as a percentage (%) of herbicidal effect relative to an untreated control according to Abbott's method and the formula [(X−Y)/X]100, where X represents the level or score of the control plants, and Y represents the level or score of the treated plants. 100% efficacy indicates full or complete control and 0% efficacy indicates no control of the weed. Ratings above 80% are generally considered acceptable. The results are summarized in Table 7 below.

TABLE 7

Herbicide effect (%) against *Trifolium repens*.

| Formulation | Application Rate (g/ha) | 3 DAT | 7 DAT | 15 DAT | 31 DAT | 42 DAT | 56 DAT |
|---|---|---|---|---|---|---|---|
| Untreated (% coverage) | — | 0 (75) | 0 (88) | 0 (91) | 0 (91) | 0 (91) | 0 (39) |
| Example 1 | | 13 | 11 | 40 | 73 | 84 | 84 |
| Fenoxaprop-p-ethyl | 99.3 | | | | | | |
| Carfentrazone-ethyl | 33.1 | | | | | | |
| Triclopyr-BEE | 545.4 | | | | | | |
| Comp. Example 1 | | 3 | 7 | 20 | 53 | 84 | 74 |
| Carfentrazone-ethyl | 42 | | | | | | |
| 2,4-D ester | 1286.2 | | | | | | |
| Mecoprop-p acid | 403.5 | | | | | | |
| Dicamba acid | 117.7 | | | | | | |

With respect to Table 7, "application rate" is measured in grams of active ingredient (AI) per hectare, and "% coverage" means the percent coverage of the area by the particular weed.

Post-Emergence Efficacy Testing Example 2—Dicot Weed Control.

A formulation (emulsifiable concentrate) containing a mixture of Fenoxaprop-p-ethyl, Carfentrazone-ethyl, and Triclopyr-butoxyethyl ester was applied in a spray chamber with a water volume of approximately 374 liter/ha on the weed species indicated below at the application rate indicated in Table 8.

Weed species: *Plantago lanceolata* established in sandy loam soil in a greenhouse under good growing conditions until the plants reached the 5- to 7-leaves stage; Location: Greenhouse, North Carolina, USA; Application timing: March 2024.

The efficacy evaluation was performed over a period of 42 days after the application or treatment (DAT). Efficacy or effectiveness was assessed as a percentage (%) of herbicidal effect relative to an untreated control according to Abbott's method and the formula $[(X-Y)/X]100$, where X represents the level or score of the control plants, and Y represents the level or score of the treated plants. 100% efficacy indicates full or complete control and 0% efficacy indicates no control of the weed. Ratings above 80% are generally considered acceptable. The results are summarized in Table 8 below.

TABLE 8

Herbicide effect (%) against *Plantago lanceolata*.

| Formulation | Application Rate (g/ha) | 0 DAT | 3 DAT | 7 DAT | 14 DAT | 29 DAT | 42 DAT |
|---|---|---|---|---|---|---|---|
| Untreated | — | 0 | 0 | 0 | 0 | 0 | 0 |
| Example 1 |  | 0 | 0 | 30 | 81 | 81 | 87 |
| Fenoxaprop-p-ethyl | 99.3 |  |  |  |  |  |  |
| Carfentrazone-ethyl | 33.1 |  |  |  |  |  |  |
| Triclopyr-BEE | 545.4 |  |  |  |  |  |  |
| Comp. Example 1 |  | 0 | 0 | 57 | 78 | 66 | 70 |
| Carfentrazone-ethyl | 42 |  |  |  |  |  |  |
| 2,4-D ester | 1286.2 |  |  |  |  |  |  |
| Mecoprop-p acid | 403.5 |  |  |  |  |  |  |
| Dicamba acid | 117.7 |  |  |  |  |  |  |

Post-Emergence Efficacy Testing Example 3—Monocot Weed Control

A formulation (emulsifiable concentrate) containing a mixture of Fenoxaprop-p-ethyl, Carfentrazone-ethyl, and Triclopyr-butoxyethyl ester was applied in a spray chamber with a water volume of approximately 374 liter/ha on the weed species indicated below at the application rate indicated in Table 9.

Weed species: *Cynodon dactylon* harvested from a field with a sod cutter, then divided into 12"×18"×3" (W×L×H) trays and allowed to acclimate to greenhouse conditions for 60 days prior to application; Location: Greenhouse, North Carolina, USA; Application timing: March 2024.

The efficacy evaluation was performed over a period of 55 days after the application or treatment (DAT). Efficacy or effectiveness was assessed as a percentage (%) of herbicidal effect relative to an untreated control according to Abbott's method and the formula $[(X-Y)/X]100$, where X represents the level or score of the control plants, and Y represents the level or score of the treated plants. 100% efficacy indicates full or complete control and 0% efficacy indicates no control of the weed. Ratings above 80% are generally considered acceptable. The results are summarized in Table 9 below.

TABLE 9

Herbicide effect (%) against *Cynodon dactylon*.

| Formulation | Application Rate (g/ha) | 3 DAT | 7 DAT | 15 DAT | 30 DAT | 41 DAT | 55 DAT |
|---|---|---|---|---|---|---|---|
| Untreated | — | 0 | 0 | 0 | 0 | 0 | 0 |
| Example 1 |  | 15 | 31 | 64 | 92 | 93 | 79 |
| Fenoxaprop-p-ethyl | 99.3 |  |  |  |  |  |  |

TABLE 9-continued

Herbicide effect (%) against *Cynodon dactylon*.

| Formulation | Application Rate (g/ha) | 3 DAT | 7 DAT | 15 DAT | 30 DAT | 41 DAT | 55 DAT |
|---|---|---|---|---|---|---|---|
| Carfentrazone-ethyl | 33.1 | | | | | | |
| Triclopyr-BEE | 545.4 | | | | | | |
| Comp. Example 1 | | 5 | 15 | 17 | 58 | 76 | 66 |
| Fenoxaprop-p-ethyl | 99.3 | | | | | | |
| Comp. Example 2 | | 3 | 17 | 20 | 70 | 84 | 82 |
| Fluazifop-p-butyl | 105 | | | | | | |

ADDITIONAL EXAMPLE EMBODIMENTS

Additional non-limiting example Embodiments are provided below.

Embodiment 1. A composition for use as an herbicide comprising an active ingredient component, a solvent component, and a surfactant component, wherein the active ingredient component comprises Fenoxaprop-p-ethyl, and at least one of Carfentrazone-ethyl and/or Triclopyr-butoxyethyl ester.

Embodiment 2. The composition of embodiment 1, wherein the active ingredient component comprises Fenoxaprop-p-ethyl, Carfentrazone-ethyl, and Triclopyr-butoxyethyl ester.

Embodiment 3. The composition of embodiments 1 or 2, wherein the solvent component comprises a di-substituted amide.

Embodiment 4. The composition of any of Embodiments 1-3, wherein the surfactant component comprises polysorbate 80.

Embodiment 5. The composition of any of the preceding Embodiments, wherein the surfactant component comprises polyalkoxylated butyl ether.

Embodiment 6. The composition of any of the preceding Embodiments, wherein the active ingredient component is present in an amount of up to 40 wt. %, based on the total weight of the composition.

Embodiment 7. The composition of any of the preceding Embodiments, wherein the Fenoxaprop-p-ethyl is present in an amount of 0.1-5 wt. % based on the total weight of the composition.

Embodiment 8. The composition of any of the preceding Embodiments, wherein the Carfentrazone-ethyl is present in an amount of 0.1-3 wt. %, based on the total weight of the composition.

Embodiment 9. The composition of any of the preceding Embodiments, wherein the Triclopyr-butoxyethyl ester is present in an amount of 15-35 wt. %, based on the total weight of the composition.

Embodiment 10. The composition of any of the preceding Embodiments, wherein the surfactant component is present in an amount of 5-15 wt. %, based on the total weight of the composition.

Embodiment 11. The composition of any of the preceding Embodiments, wherein the polysorbate 80 is present in an amount of about 5 wt. %, based on the total weight of the composition.

Embodiment 12. The composition of any of the preceding Embodiments, wherein the polyalkoxylated butyl ether is present in an amount of about 5 wt. %, based on the total weight of the composition.

Embodiment 13. The composition of any of the preceding Embodiments, wherein the solvent component is present in an amount of 40-80 wt. %, based on the total weight of the composition.

Embodiment 14. The composition of any of the preceding Embodiments, wherein the composition exhibits a degradation in or of the active ingredient component of less than 5%, based on its weight percent in the composition.

Embodiment 15. The composition of any of the preceding Embodiments, wherein the composition exhibits the degradation at lower than ambient temperature and/or at higher than ambient temperature.

Embodiment 16. The composition of any of the preceding Embodiments, wherein the composition is a low odor formulation.

Embodiment 17. A method of controlling or eradicating weeds, the method comprising providing a composition of any of Embodiments 1-16; and administering the composition to an area containing weeds.

Embodiment 18. The method of Embodiment 17, wherein up to 100% eradication of weeds is achieved at a time period following the administering.

Embodiment 19. The method of Embodiment 17 or 18 wherein the administering comprises spraying the composition.

Embodiment 20. The method of any of Embodiments 17-19 further comprising diluting the composition with water to form a sprayable preparation.

Many different arrangements of the various components and/or steps depicted and described, as well as those not shown, are possible without departing from the scope of the claims below. Embodiments of the present technology have been described with the intent to be illustrative rather than restrictive. Alternative embodiments will become apparent from reference to this disclosure. Alternative means of implementing the aforementioned can be completed without departing from the scope of the claims below. Certain features and subcombinations are of utility and can be employed without reference to other features and subcombinations and are contemplated within the scope of the claims.

The invention claimed is:

1. An emulsifiable concentrate composition for use as an herbicide comprising:
    an active ingredient component comprising fenoxaprop-p-ethyl, carfentrazone-ethyl and triclopyr-butoxyethyl ester;
    a solvent component; and
    a surfactant component, the surfactant component comprising a nonionic alkoxylated surfactant and/or a sorbitan ester;

wherein the composition exhibits a degradation in the active ingredient component of less than 5%, based on the weight percent in the composition.

2. The emulsifiable concentrate composition of claim 1, wherein the solvent component comprises a di-substituted amide.

3. The emulsifiable concentrate composition of claim 1, wherein the surfactant component comprises polysorbate 80.

4. The emulsifiable concentrate composition of claim 1, wherein the surfactant component comprises polyalkoxylated butyl ether.

5. The emulsifiable concentrate composition of claim 1, wherein the active ingredient component is present in an amount up to 40 wt. %, based on the total weight of the composition.

6. The emulsifiable concentrate composition of claim 1, wherein the fenoxaprop-p-ethyl is present in an amount of 0.1-5 wt. % based on the total weight of the composition.

7. The emulsifiable concentrate composition of claim 1, wherein the carfentrazone-ethyl is present in an amount of 0.1-3 wt. %, based on the total weight of the composition.

8. The emulsifiable concentrate composition of claim 1, wherein the triclopyr-butoxyethyl ester is present in an amount of 15-35 wt. %, based on the total weight of the composition.

9. The emulsifiable concentrate composition of claim 1, wherein the surfactant component is present in an amount of 5-15 wt. %, based on the total weight of the composition.

10. The emulsifiable concentrate composition of claim 3, wherein the polysorbate 80 is present in an amount of about 5 wt. %, based on the total weight of the composition.

11. The emulsifiable concentrate composition of claim 4, wherein the polyalkoxylated butyl ether is present in an amount of about 5 wt. %, based on the total weight of the composition.

12. The emulsifiable concentrate composition of claim 1, wherein the solvent component is present in an amount of 40-80 wt. %, based on the total weight of the composition.

13. The emulsifiable concentrate composition of claim 1, wherein the composition exhibits the degradation at lower than ambient temperature and/or at higher than ambient temperature.

14. The emulsifiable concentrate composition of claim 1, wherein the composition is a low odor formulation.

15. A method of controlling or eradicating weeds, the method comprising:
providing an emulsifiable concentrate composition of claim 1; and administering the emulsifiable concentrate composition to an area containing weeds.

16. The method of claim 15, wherein up to 100% eradication of weeds is achieved at a time period following the administering.

17. The method of claim 15, wherein the administering comprises spraying the emulsifiable concentration composition.

18. The method of claim 15 further comprising diluting the emulsifiable concentrate composition with water to form a sprayable preparation.

* * * * *